United States Patent [19]

Bland

[11] 4,004,640
[45] Jan. 25, 1977

[54] HANGER MECHANISM AND SAIL ENGAGING TOOL ATTACHED TO TOOL BAR THEREBY

[76] Inventor: Charles W. Bland, P.O. Box 405, Wakita, Okla. 73771

[22] Filed: Feb. 23, 1976

[21] Appl. No.: 660,226

[52] U.S. Cl. ............................ 172/710; 111/52; 172/307; 172/484; 172/572; 172/705
[51] Int. Cl.² ................ A01B 61/04; A01B 65/06
[58] Field of Search ......... 172/138, 139, 142, 165, 172/166, 307, 484, 500, 570, 572, 573, 614, 615, 624, 626, 627, 643, 657, 691, 697, 705, 707, 708, 710; 111/52, 81, 85, 86, 87, 88; 74/103; 248/284; 211/173

[56] References Cited

UNITED STATES PATENTS

| 1,031,518 | 7/1912 | Brigden | 172/573 |
|---|---|---|---|
| 1,589,727 | 6/1926 | Travell | 74/103 UX |
| 1,642,908 | 9/1927 | Taylor | 172/573 |
| 2,695,577 | 11/1954 | Webster | 172/166 X |
| 2,730,029 | 1/1956 | Brundage | 172/484 X |
| 2,836,112 | 5/1958 | Griffin | 172/307 |
| 2,987,127 | 6/1961 | Morrison et al. | 172/484 |
| 3,265,137 | 8/1966 | Couser | 172/307 |
| 3,571,956 | 3/1971 | Heiberg | 172/484 X |
| 3,670,824 | 6/1972 | Buchanan | 172/484 X |
| 3,901,169 | 8/1975 | Ribouleau | 111/52 |

FOREIGN PATENTS OR APPLICATIONS

| 648,601 | 11/1962 | Italy | 172/710 |
|---|---|---|---|
| 608,815 | 9/1948 | United Kingdom | 172/166 |

*Primary Examiner*—Richard T. Stouffer
*Attorney, Agent, or Firm*—William S. Dorman

[57] ABSTRACT

A hanger mechanism for the attachment of a soil engaging tool to a horizontal tool bar located at the forward end of an agricultural vehicle through a series of pivotally interconnected structures. The hanger mechanism includes an upper and lower arm structure which extend forward from the tool bar and are disposed one above the other. A vertical bar structure is pivotally connected to the forward ends of the upper and lower arm structures with the upper and lower arm structures parallel. An implement arm having an upper end adjacent and below the forward end of the lower arm structure extends rearward and downwardly to a lower end. The implement arm is pivotally attached between the upper and lower ends thereof to an extension of the vertical bar structure. A connecting link is pivotally attached at one end to the lower arm structure rearward from the forward end thereof, and pivotally attached at its other end to the upper end of the implement arm. The seven pivotal axes thus formed are parallel to the tool bar which allows the lower end of the implement arm to move substantially vertically when urged upward or downward. The soil engaging tool is mounted on the lower end of the implement arm.

5 Claims, 3 Drawing Figures

HANGER MECHANISM AND SAIL ENGAGING TOOL ATTACHED TO TOOL BAR THEREBY

BACKGROUND OF THE INVENTION

1. Field of the Invention

The present invention relates to the hanger mechanism for the attachment of a soil engaging tool to a tool bar. More particularly, the present invention relates to a hanger mechanism which utilizes two parallel arm structures pivotally interconnected to other structures and allows the soil engaging tool to move only in a substantially vertical direction as the soil engaging tool moves over changes in the contour of the soil surface.

2. Description of the Prior Art

In various farming operations such as planting and plowing, it is well known that it is desireable to maintain a soil engaging tool at a uniform depth within the soil.

A type of hanger mechanism typical of those known in the prior art has a single arm which extends rearward (with reference to the tractor) from a tool bar and is pivotally attached to the tool bar. The soil engaging tool is attached at the rearward end of the arm. A pressure rod which is provided with a compression spring could be attached between the tool bar and the soil engaging tool (or at said opposite end of the single arm) in an attempt to maintain the soil engaging tool at a constant depth. This construction will substantially vary the depth of the soil engaging tool (unless there is an extremely long radius) because the soil engaging tool will not move in a substantially vertical direction. The soil engaging tool will move about an arc whose radius is the distance between said tool and the tool bar. Thus, as the soil engaging tool is urged upward and downward, it moves about an arc and its angular relationship with the vertical changes which will alter the depth of the soil engaging tool within the soil.

This prior construction, in order to allow the soil engaging tool to move substantially vertically, would have to extend rearward (with reference to the tractor) from the tool bar a considerable distance. The extension of the hanger mechanism would prevent or make difficult the transporting or folding of the agricultural vehicle if desired.

SUMMARY OF THE INVENTION

The present invention involves a hanger mechanism for attachment of soil engaging tools to a standard tool bar attached to an agricultural vehicle. Two longitudinally parallel arm structures are pivotally attached to lugs or ears provided on the tool bar. The arm structures are disposed one above the other and extend forward (with reference to the agricultural vehicle) from the tool bar. The arm structures are pivotally attached to a vertical bar structure at their forward ends. The upper ends of one or more implement arms are located adjacent and below the forward end of the lower arm structure. The implement arms extend rearward (with reference to the agricultural vehicle) and downward. Various soil engaging tools, for example, a shovel or seed drill, can be attached to the lower, rearward, end of the implement arm. Connecting links are pivotally attached at one end to the lower arm structure between the forward and rearward ends and at the other end to the forward end of the implement arm. An extension of the vertical bar structure is pivotally attached to the forward end of the implement arm. A pressure rod is provided for applying pressure between the implement arm and the tool bar to assist in maintaining the proper depth. The seven pivotal axes of the hanger mechanism give the soil engaging tool a large radius about which it pivots. As the contour of the soil surface changes, the soil engaging tools will flex upward and downward in relation to the tool bar, but because of the large radius, soil engaging tool will move in a substantially vertical direction.

DESCRIPTION OF THE PREFERRED EMBODIMENT

Figure 1:
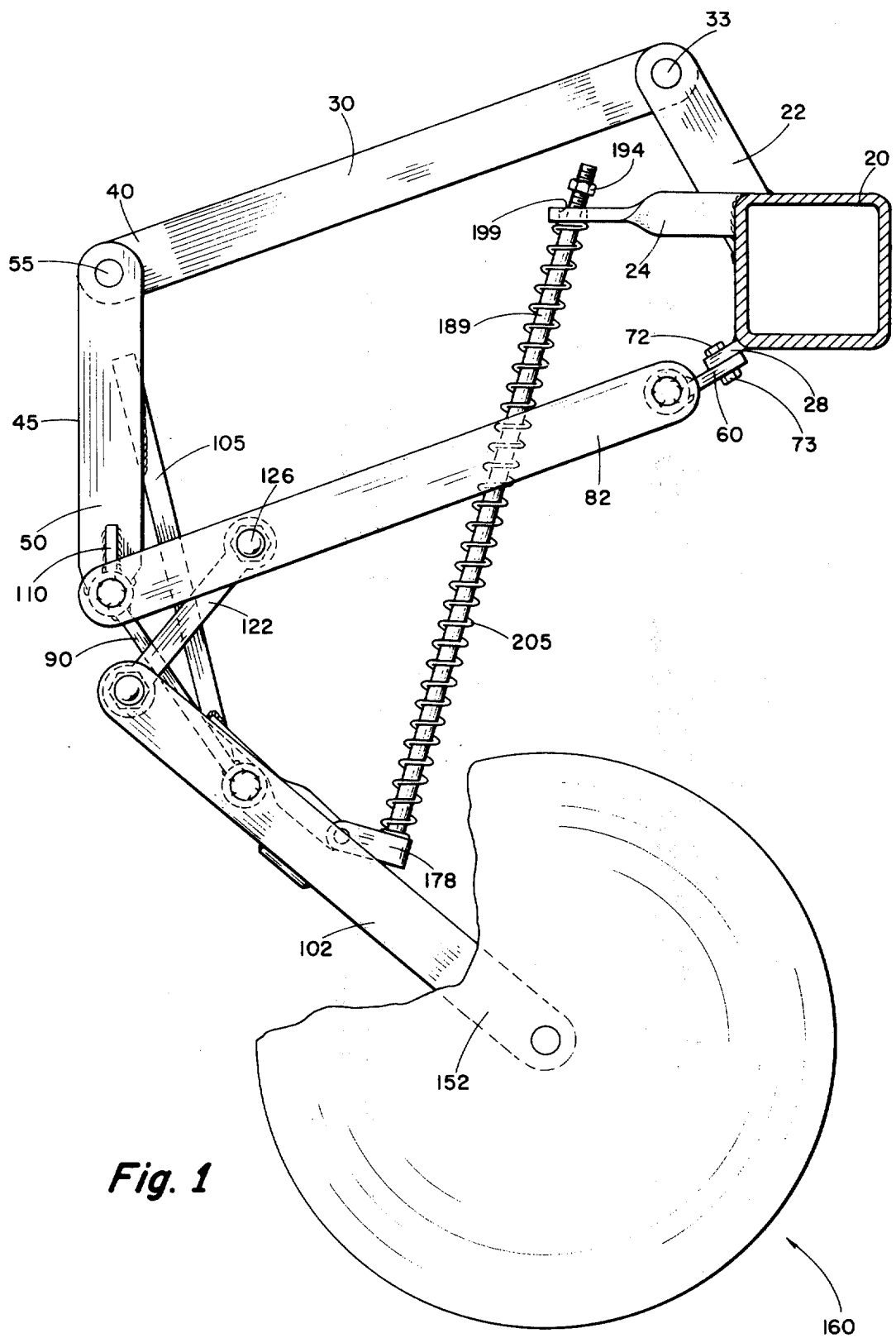
FIG. 1 is a side view of a hanger mechanism constructed according to the present invention.
Figure 2:
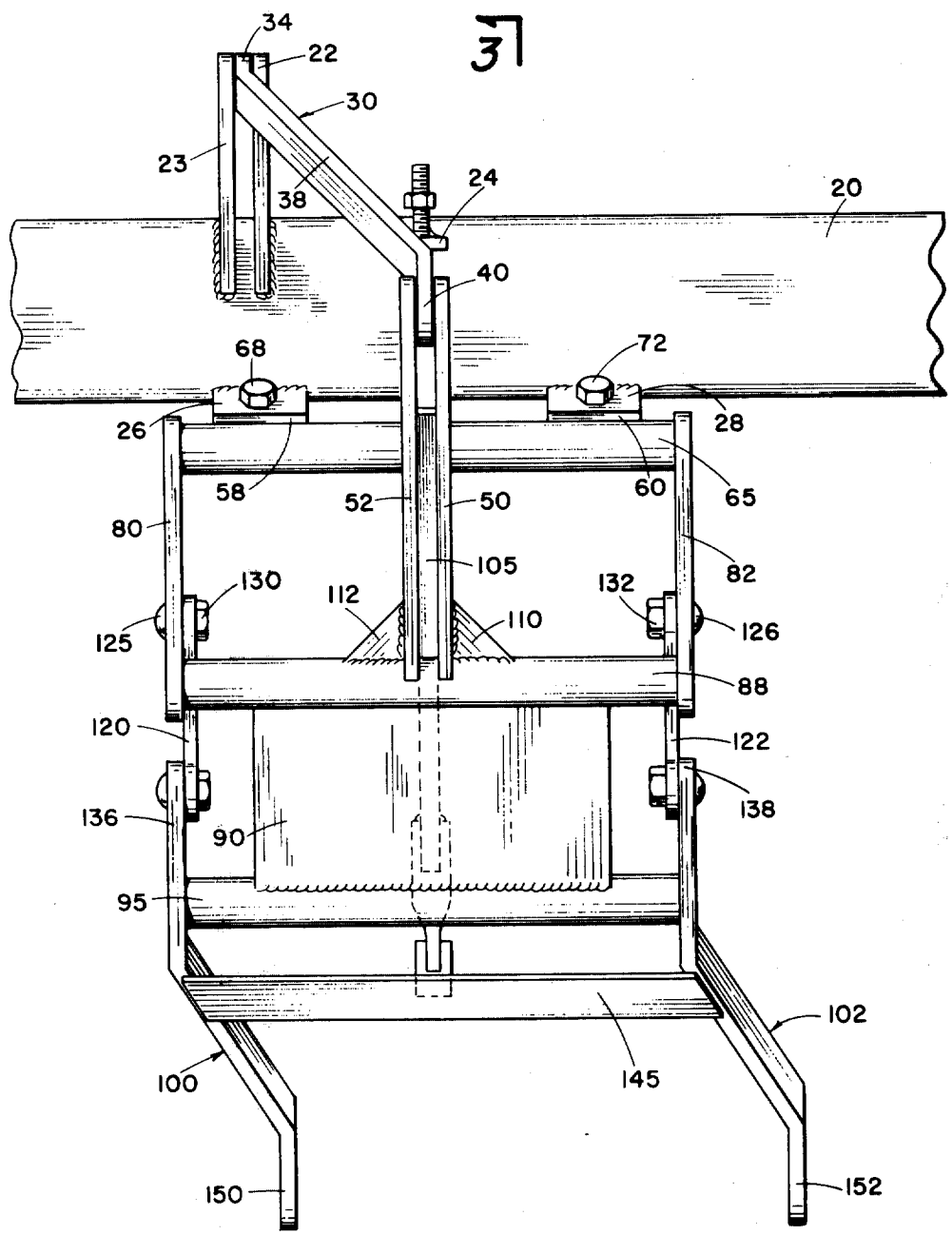
FIG. 2 is a front view of the hanger mechanism shown in FIG. 1.
Figure 3:
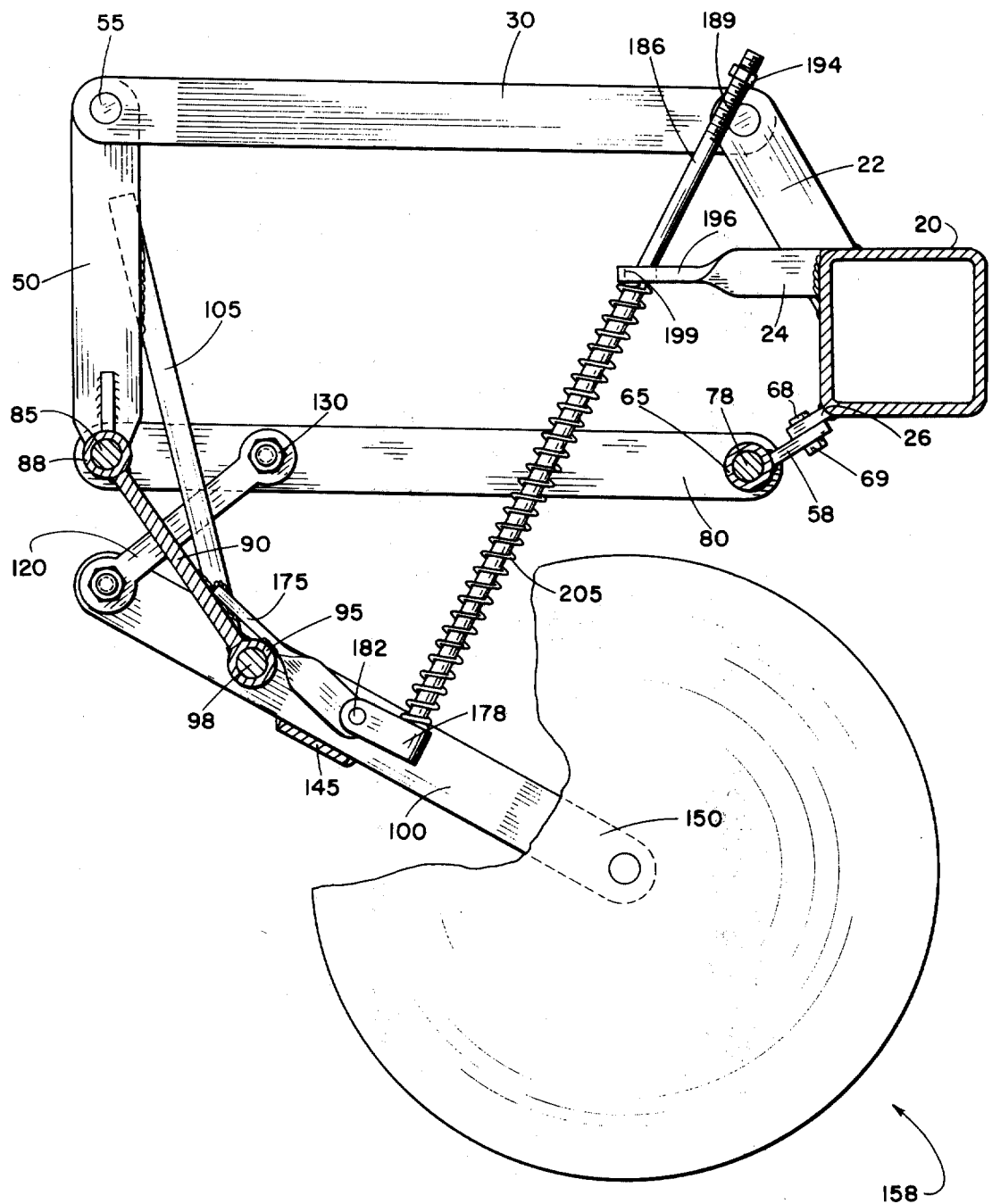
FIG. 3 is a cross sectional view of the hanger mechanism taken along section line 3—3 of FIG. 2.

The hanger mechanism as shown in FIG. 1 is attached to a tool bar 20. The tool bar is of conventional design and could be part of a standard agricultural vehicle (not shown) or attached directly to a tractor (not shown). The tool bar would usually be located at the forward part of the agricultural vehicle. The tool bar has a square cross section (as shown in FIGS. 1 and 3), and has lugs 22 and 23 (FIG. 2), and ear 24 (FIG. 1), and nibs 26 and 28 (FIG. 2) attached thereto by some standard method, for example, welding. Lugs 22 and 23 are offset from ear 24 to the left (as shown in FIG. 2), and extend upward and slightly forward (with reference to the tractor) from tool bar 20.

An arm 30 is pivotally attached between lugs 22 and 23 by some standard method, for example, by a pin 33 (not shown in detail) passed through holes in lugs 22 and 23, and arm 30 and provided with a washer and cotter pin (not shown). The end 34 (FIG. 2) of arm 30 is perpendicular to the axis of tool bar 20. Arm 30 is bent toward the right (as shown in FIG. 2) and extends from the bend in straight segment 38. The other end 40 of arm 30 is bent to the left and is perpendicular to the axis of tool bar 20. The purpose of the offset of lugs 22 and 24 and this bending of arm 30 will be explained in detail hereinafter.

End 40 of arm 30 is pivotally attached to a vertical bar structure 45 (FIG. 1). The upper portion of vertical bar structure 45 is comprised of two vertical bars 50 and 52 (as shown in FIG. 2), which are spaced slightly apart. End 40 of arm 30 is pivotally attached to vertical bar structure 45 by placing end 40 between vertical bars 50 and 52. The actual attachment would be by some standard method (not shown in detail), for example, a pin 55 passed through holes in arm 30 and vertical bars 50 and 52 and provided with a cotter pin. Arm 30 forms the upper arm structure.

Nibs 26 and 28 are similar to each other and extend forward and downward from tool bar 20 (as shown in FIGS. 1 and 3). Two nibs 58 and 60 are attached to a pipe section 65 by some standard method, for example, welding. Nibs 26, 28, 58 and 60 are provided with alignment holes. The alignment holes in nibs 26 and 28 are juxtaposed with the alignment holes in nibs 58 and 60, respectively. Bolt 68 (FIG. 2) is passed through the alignment holes in nibs 26 and 58 and is provided with a nut 69 (FIG. 3) for placement on the threaded end of bolt 68 for tightening nibs 26 and 58 together. Bolt 72 (FIG. 1) is passed through the holes in nibs 28 and 60 and is provided with a nut 73 (FIG. 1) for placement on the threaded end of bolt 72 for tightening nibs 28 and 60 together.

A rod 78 (FIG. 3) is fitted into the hollow interior of pipe section 65 for forming a bearing therewith. The ends of rod 78 are secured to arms 80 and 82 by some standard method, for example, being welded into holes provided in arms 80 and 82. The ends of pipe section 65 abut the sides of arms 80 and 82 which prevents lateral movement of arms 80 and 82 with respect to pipe section 65 and tool bar 20.

Arms 80 and 82 extend forward away from tool bar 20 and are attached at the other end to a rod 85 (FIG. 3) in a manner similar to the attachment of rod 78 to arms 80 and 82. Rod 85 is fitted into a pipe section 88 similar to the fitting of rod 78 into pipe section 65. Arms 80 and 82 make up the lower arm structure.

Pipe section 88 is attached to a support plate or extension 90 and vertical bars 50 and 52 of vertical bar structure 45. Support plate or extension 90, which has a length less than the length of pipe section 88, extends downward and rearward where it is attached to a pipe section 95 (FIG. 3). A rod 98 (FIG. 3) is fitted into pipe section 95, and forms a bearing therewith similar to the bearings formed by rod 78 with pipe section 65 and rod 85 with pipe section 88. Rod 98 is attached to implement arms 100 and 102 at a location spaced from the forward ends thereof in a manner similar to the attachment of rod 78 to arms 80 and 82, and rod 85 to arms 80 and 82. Arms 30, and 80 and 82 have the same length between their pivotal connections; this maintains the vertical orientation of the vertical bar structure 45 as the upper and lower arm structures pivot.

A transverse member 105 is attached between vertical bars 50 and 52 by some standard method, for example, by welding. The transverse member extends to the lower end of support plate or extension 90 and is attached thereto by some standard method, for example, welding. Transverse member 105 acts as a brace and gives added rigidity to the fixed relationship between vertical bars 50 and 52, pipe section 88, and support plate or extension 90. Additional support is obtained from triangular braces 110 and 112 (FIG. 2) attached between the vertical bars 50 and 52 (FIG. 2) and pipe section 88.

Connecting links 120 and 122 (FIG. 2) are pivotally attached to arms 80 and 82, respectively, by some standard method, for example, by passing bolts 125 and 126 (FIG. 2) through holes provided in arm 80 and connecting link 120, and in arm 82 and connecting link 122, respectively, and placing suitable nuts 130 and 132 (FIG. 2) on the threaded ends of bolts 122 and 126, respectively. Washers could also be provided to prevent slippage of the nuts.

Connecting links 120 and 122 extend downward and forward (as shown in FIGS. 1 and 3) and are pivotally attached to one end (designated 136 and 138 in FIG. 2, respectively) of implement arms 100 and 102, respectively. The connecting links may be pivotally attached to their respective implement arms in a manner similar to their attachment to arms 80 and 82 (as discussed above), or by some other standard method.

The implement arms extend rearward from the location of attachment to the connecting links. Below the area of attachment of rod 98, both implement arms are bent slightly to the right (as shown in FIG. 2). Just below this bend, a brace 145 is attached between implement arms 100 and 102. The brace 145 gives added lateral strength to the implement arms and aids in maintaining the desired separation of the implement arms. Toward the rearward ends 150 and 152 of the implement arms 100 and 102, respectively, is located another bend which is to the left (as shown in FIG. 2) so that the ends 150 and 152 extend rearward and are perpendicular to the axis of tool bar 20. A soil engaging tool (generally designated as 158 in FIG. 3 and 160 in FIG. 1), which could be any of the number of various soil engaging tools known in the prior art, such as a shovel, a seed drill, etc., is attached, as required by its particular structure, to its respective implement arms at the rearward ends thereof. The bends in implement arms 100 and 102 allow the soil engaging tools to be centered beneath arms 80 and 82.

A leg 175 (FIG. 3) is attached to support plate or extension 90, pipe section 95, and transverse member 105 by some standard method, for example, welding, and extends slightly rearward and downward therefrom. A ferrule 178 which has a notch (not shown in detail) is pivotally attached to the lower end of leg 175 by some standard method, for example, placing the notch in the ferrule over the end of the leg 175 and passing a pin 182 provided with a cotter pin (not shown) through the holes in the ferrule and the leg provided for that purpose.

Pressure rod 186 is attached onto the ferrule 178 by some standard method, being welding into a hole in the ferrule. The pressure rod extends upward and rearward from the ferrule 178 and has an upper threaded end 189 (FIG. 3). A suitable nut 194 is threaded onto the upper end 189. Ear 24 (which has one end attached to tool bar 20 as discussed above) has a flat horizontal portion 196 at its free end. A hole 199 with a somewhat larger diameter than the pressure rod 186 is provided in the flat portion 196 of ear 24. The pressure rod 186 extends through the hole 199 which forms a loose hole relationship between the pressure rod and ear 24.

A compression spring 205 is helically wound around pressure rod 186. The lower end of the compression spring rests against ferrule 178 (or might be attached thereto). The upper end of the compression spring rests against the flat portion 196 of ear 24. The hole 199 in ear 24 is small enough (or a washer around rod 186 might be used) to allow movement of the pressure rod but not allow the upper end of the spring to pass therethrough. The spring is compressed so that it constantly exerts force between the ferrule 178 and ear 24 (to be discussed in detail hereinafter). Nut 194 is of sufficient outer diameter that it will not pass through hole 199 which prevents the pressure rod from exiting the hole 199 in ear 24.

The operation of the hanger mechanism will be discussed in relation to FIGS. 1 and 3. FIG. 1 shows the implement arm 102 with end 152 close to its extreme lowered position with nut 194 almost in contact with ear 24. FIG. 3 shows the implement arm 100 within 150 in raised position with the compression spring 205 being more compressed (in FIG. 3) as compared to FIG. 1. The preferred operating position would be between these positions. The purpose of the bends in arm 30 and the offsetting of lugs 22 and 23 is to allow pressure rod 186 to freely move upward through hole 199 past the vertical position of arm 30 (as shown in FIG. 3).

The hanger mechanism has seven pivotal axes. The pivotal axis located between lugs 22 and 23, and arm 30, the upper arm structure. The pivotal axis formed between arm 30 (the upper arm structure) and vertical bar structure 45. The pivotal axis at the rearward end and the pivotal axis at the forward end of the lower arm structure, arms 80 and 82, formed between nibs 58 and 60, and vertical bar structure 45, respectively. The pivotal axis located between the connecting links and their respective arms. The pivotal axis located at the opposite end of the connecting link and the forward ends of the implement arms. The pivotal axis located between the support plate or extension 90 and the implement arms. These seven pivotal axes are parallel to the axis of tool bar 20.

As a tractor (not shown) moves tool bar 20 and the hanger mechanism forwad (to the left as shown in FIGS. 1 and 3), the difference in the altitude between the soil surface and tool bar 20 will vary. (It is well known that soil surfaces are uneven.) If the altitude difference decreases, the soil engaging tools 158 and 160 will be urged upward against the force exerted by the compression spring (toward the position shown in FIG. 3) because the greater the depth of penetration of the soil, the greater the pressure needed to maintain that depth. The hanger mechanism will pivot about its seven pivotal axes allowing the soil engaging tool to move upward in a substantially vertical direction. If the altitude difference increases, the soil engaging tools 158 and 160 will be urged downward (toward the position shown in FIG. 1) by the compression spring 205 (through implement arm 100 and 102). The hanger mechanism will pivot about its seven pivotal axes to maintain the soil engaging tools in contact with the soil, i.e., the soil engaging tool will move substantially vertically. As may be seen from a comparison of the positions of the ends of the implement arms (in FIGS. 1 and 3) the angle between the rearward ends 150 and 152 of the implement arms and the vertical is substantially the same. The above would, of course, be identical for the soil engaging tools attached to the ends of the implement arms.

The horizontal compactness of the hanger mechanism when compared to the substantially vertical movement provided to the soil engaging tool is beneficial because of the desireability of folding large agricultural vehicles for transport between work areas or fields.

Although the hanger mechanism as shown in FIGS. 1, 2 and 3 is adapted for two soil engaging tools, the hanger mechanism could easily be constructed for one soil engaging tool or for three or more soil engaging tools. The bends of the various arms could be arranged differently or even eliminated. The various parts could be of various shapes and materials, for example, the support plate or extension 90 could be a series of bars welded between pipe sections 88 and 95. The pressure rod 189 could be replaced by weighting the ends 150 and 152 of the implement arms. The tool bar 20 could be of various shapes. Further, the hanger mechanism could be connected directly to a tractor through various linkages known to those skilled in the prior art.

Whereas the present invention has been described in particular relation to the drawing attached hereto, it should be understood that other and further modifications, apart from those shown or suggested herein, may be made within the spirit and scope of this invention.

What is claimed is:

1. In the combination of a horizontal tool bar and a soil engaging tool connected thereto by a hanger mechanism, the improvement wherein the hanger mechanism comprises an upper arm structure pivotally attached at one end to said tool bar for pivotal movement about a first axis parallel to said tool bar, said upper arm structure extending forward away from said tool bar and terminating at a forward end, a lower arm structure pivotally attached at one end to said tool bar for pivotal movement about a second axis parallel to and below said first axis, said lower arm structure extending forward away from said tool bar and terminating at a forward end, a vertical bar structure pivotally attached at its upper end to the forward end of said upper arm structure for pivotal movement about a third axis parallel to said first axis, said vertical arm structure being pivotally attached at a location below the upper end thereof to the forward end of said lower arm structure for pivotal movement about a fourth axis below and parallel to said third axis, said vertical bar structure maintaining said upper and lower arm structures parallel to each other during any pivotal movement thereof, said vertical bar structure having a downward projecting extension terminating in a lower end, an implement arm located below said lower arm structure, said implement arm extending downward and rearward from an upper end thereof located below and adjacent said fourth axis to a lower end upon which said soil engaging tool is mounted, connecting link means pivotally connected at one end thereof to the upper end of said implement arm for pivotal movement about a fifth axis parallel to and below said fourth axis, said connecting link means being pivotally connected at an end opposite from said one end thereof to said lower arm structure at a location rearward of the forward end thereof for pivotal movement about a sixth axis parallel to and rearward of said fourth axis, the lower end of said extension being pivotally connected to said implement arm between the ends thereof for pivotal movement about a seventh axis parallel to and rearward of said fifth axis whereby the lower end of said implement arm moves in a substantially vertical direction.

2. The hanger mechanism as set forth in claim 1 including an ear attached to said tool bar and provided with a hole therein, a pressure rod pivotally attached at its lower end to said extension and extending upward through said hole in said ear and beyond and slideable through said hole, and a spring in compression wound helically around said rod between the lower end of said rod and said ear for urging said implement arm in a downward direction.

3. The hanger mechanism as set forth in claim 1 wherein said extension extends downward and rearward from said fourth axis to said seventh axis.

4. In the combination of a horizontal tool bar and a plurality of soil engaging tools, wherein each soil engaging tool is connected to the tool bar by a hanger mechanism, the improvement wherein each hanger mechanism comprises an upper arm structure pivotally attached at one end to said tool bar for pivotal movement about a first axis parallel to said tool bar, said upper arm structure extending forward away from said tool bar and terminating at a forward end, a lower arm structure pivotally attached at one end to said tool bar for pivotal movement about a second axis parallel to and below said first axis, said lower arm structure extending forward away from said tool bar and terminating at a forward end, a vertical bar structure pivotally attached at its upper end to the forward end of said upper arm structure for pivotal movement about a third axis parallel to said first axis, said vertical arm structure being pivotally attached at a location below the upper end thereof to the forward end of said lower arm structure for pivotal movement about a fourth axis below and parallel to said third axis, said vertical bar structure maintaining said upper and lower arm structures parallel to each other during any pivotal movement thereof, said vertical bar structure having a downward projecting extension terminating in a lower end, a plurality of implement arms located below said lower arm structure, each of said implement arms extending downward and rearward from an upper end thereof located below and adjacent said fourth axis to a lower end upon which one of said soil engaging tools is mounted, connecting link means pivotally connected at one end thereof to the upper end of each said implement arm for pivotal movement about a fifth axis parallel to and below said fourth axis, said connecting link means being pivotally connected at an end opposite from said one end thereof to said lower arm structure at a location rearward of the forward end thereof for pivotal movement about a sixth axis parallel to and rearward of said fourth axis, the lower end of said extension being pivotally connected to each said implement arm between the ends thereof for pivotal movement about a seventh axis parallel to and rearward of said fifth axis, whereby each of said soil engaging tools moves in a substantially vertical direction.

5. The hanger mechanism as set forth in claim 4 including an ear attached to said tool bar and provided with a hole therein, a pressure rod pivotally attached at its lower end to said extension and extending upwardly through said hole in said ear and beyond and slideable through said hole, and a spring in compression wound helically around said rod between the lower end of said rod and said ear for urging said implement arms in a downward direction.

* * * * *